United States Patent [19]

Peterson et al.

[11] Patent Number: 4,678,952
[45] Date of Patent: Jul. 7, 1987

[54] SEALED JOINT FOR A ROBOT AND THE LIKE

[75] Inventors: Thomas W. Peterson, Corvallis; David B. Hole, Albany; S. Stanley Mintz, Corvallis, all of Oreg.

[73] Assignee: Intelledex Incorporated, Corvallis, Oreg.

[21] Appl. No.: 765,867

[22] Filed: Aug. 13, 1985

[51] Int. Cl.$^4$ .......... B25J 1/10; F16H 1/28; H02K 5/128
[52] U.S. Cl. .......... 310/83; 74/640; 414/8; 901/29
[58] Field of Search .......... 74/640, 804; 310/90, 310/54, 77, 83, 89, 88; 384/477, 482, 484, 489; 414/4, 8; 901/25, 28, 29, 49

[56] References Cited

U.S. PATENT DOCUMENTS

| | | | |
|---|---|---|---|
| 3,512,024 | 5/1970 | Papa | 310/88 |
| 3,823,569 | 7/1974 | Sellmaier et al. | 310/54 |
| 4,068,536 | 1/1978 | Stackhouse | 74/417 |
| 4,129,797 | 12/1978 | Lindner | 310/77 |
| 4,322,030 | 3/1982 | Jacobson et al. | 310/54 |
| 4,398,110 | 8/1983 | Flinchbaugh et al. | 310/83 |
| 4,402,234 | 9/1983 | Malarz et al. | 901/29 |
| 4,431,366 | 2/1984 | Inaba et al. | 414/735 |
| 4,577,127 | 3/1986 | Ferree et al. | 310/83 |

Primary Examiner—Patrick R. Salce
Assistant Examiner—D. L. Rebsch

[57] ABSTRACT

A sealed joint having two adjacent, axially aligned sleeves separated by a rotating seal, one joint being movable with respect to the other. The joints contain a tubular passageway surrounded by a motor and a harmonic drive. A tachometer and a brake help to control the motor and a position encoder measures rotational motion between the sleeves. All components are mounted in sealed relation with respect to the outside of the sleeves. A sealable port communicates with the interior of the tubular passageway for each sleeve so that control cables and fluid conduits may pass into the joint through one port, along the tubular passageway and out of the other port.

19 Claims, 5 Drawing Figures

4,678,952

SEALED JOINT FOR A ROBOT AND THE LIKE

DESCRIPTION

1. Technical Field

The invention relates to joints having axially aligned members, especially for robots and the like.

2. Background Art

In the manufacture of semiconductor integrated circuits, the cleanliness required for high yield chip manufacture is obtained by performing all the fabrication operations in a clean room environment. This clean room environment is principally established and maintained by a constant laminar flow circulation of air through ultrapure filters located in the ceiling, then downward through the volume of the room and finally out of the room through a porous floor. In time this downward laminar flow of air establishes the clean room environment by driving the contaminants from the room and/or trapping them in recesses within the room from which they cannot escape. However, those particles which inevitably remain in the clean room despite this laminar air flow and do not pass out of the room through its floor tend to settle on the horizontal surfaces within the room just as dust settles onto a polished wood table in a home.

While by most normal human standards the air in an integrated circuit factory clean room is very clean, integrated circuit manufacturers are constantly striving to reduce contamination within their clean rooms because improved cleanliness increases the yield of good integrated circuit chips. Further, each advance in integrated circuit manufacture which reduces the size of the chips or correspondingly allows the manufacture of ever more complicated chips imposes ever more stringent requirements on cleanliness to achieve an economically acceptable yield of good integrated circuit chips. Because the workers present in the clean room of an integrated circuit factory are a highly significant if not the major source of contamination, the present trend in achieving the higher levels of cleanliness required for advanced, very large scale integrated circuit manufacturing is to automate wafer processing as much as possible so fewer workers need be in the clean room environment.

It has occurred to others that robots might be ideal for use in an integrated circuit factory. However, with the standards of cleanliness previously mentioned, wear surfaces in robots would cause deterioration of the clean room environments now found in such factories.

U.S. Pat. No. 4,068,536 to Stackhouse shows a robot joint featuring two sets of concentric shafts with individual shafts within each set independently rotatable about an axis common to the set. The common axes of the two sets are obliquely oriented with respect to each other; and a third shaft, rotatable about a third axis, is angularly oriented and connected to the most remote set of shafts. Each set of shafts has members connected to a pair of bevel gears, with one pair of bevel gears driving the other pair for power transfer between the sets of shafts.

U.S. Pat. No. 4,431,366 to Inaba et al. shows a robot wrist having a harmonic drive for transferring power between members with a substantial speed reduction between members on opposite sides of the drive.

An object of the invention was to devise a joint for robots which could link members of a robot arm without spreading wear particles into the factory environment.

SUMMARY OF THE INVENTION

The above object has been achieved with a sealed joint which features an internally contained motor, sensors for controlling the motor, and a harmonic drive. All members are housed in closed laterally adjacent sleeves separated by a rotary seal, the sleeves having a common axial passageway, about which all components are disposed. Thus, no external shafts are needed to transfer power to the rotary members, the sleeves. This has the benefit of confining wear surfaces within the sleeves so that particles cannot escape from inside the joint.

The sleeves are provided with sealable ports communicating spatially with the common axial passageway so that electrical cables and fluid conduits can pass through the joint or into it for control purposes. Robot arm members are connected to the joint at the ports.

BEST MODE FOR CARRYING OUT OF THE INVENTION

Figure 1:
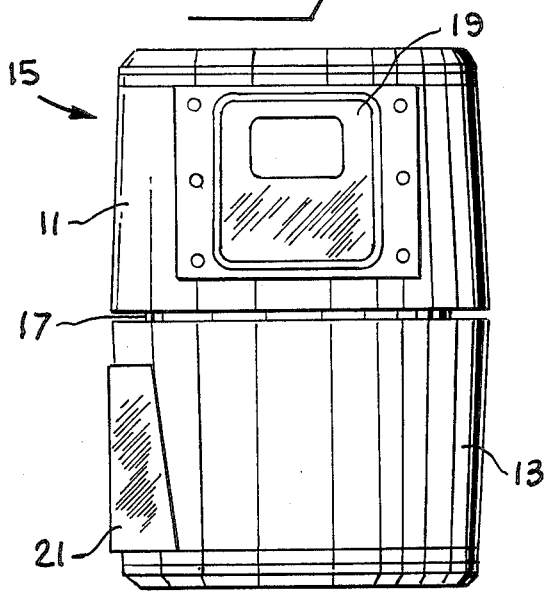
FIG. 1 is a side elevation view of the joint of the present invention.

With reference to FIG. 1, a pair of sleeves 11 and 13 is seen forming the exterior of the joint 15. The sleeves are axially aligned and abutting, separated by a rotating seal 17. The two sleeves are approximately the same size and have a slight taper toward the extremities. The sleeves 11 and 13 appear to be cup-shaped with the rotating seal joining the two cups near the end which would normally be open. However, the sleeves are completely closed except that sleeve 11 has a sealable port 19 and sleeve 13 has a sealable port 21. The two sealable ports are seen to be at right angles to each other, but may be at any orientation since joint 15 includes a motor within the sleeve for transferring rotational power from one sleeve to the other so that one sleeve may rotate relative to the other.

Figure 3:
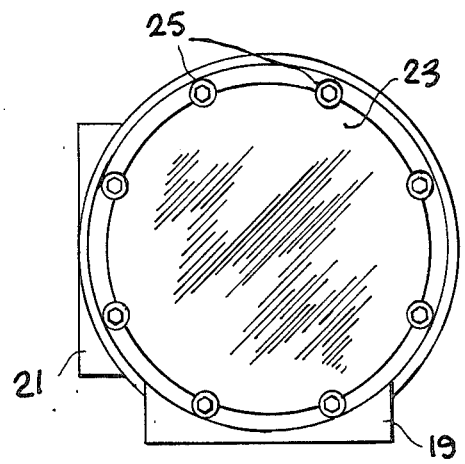
FIGS. 2 and 3 respective left and right end views of the joint of FIG. 1.
Figure 2:
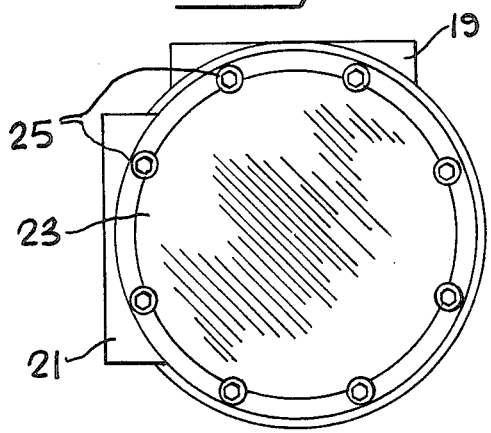

In FIGS. 2 and 3 the sealable ports 19 and 21 are seen to extend outwardly only a short distance from the joint. Cover plates 23 close the opposite outward ends of each sleeve with tight seals.

Figure 4:
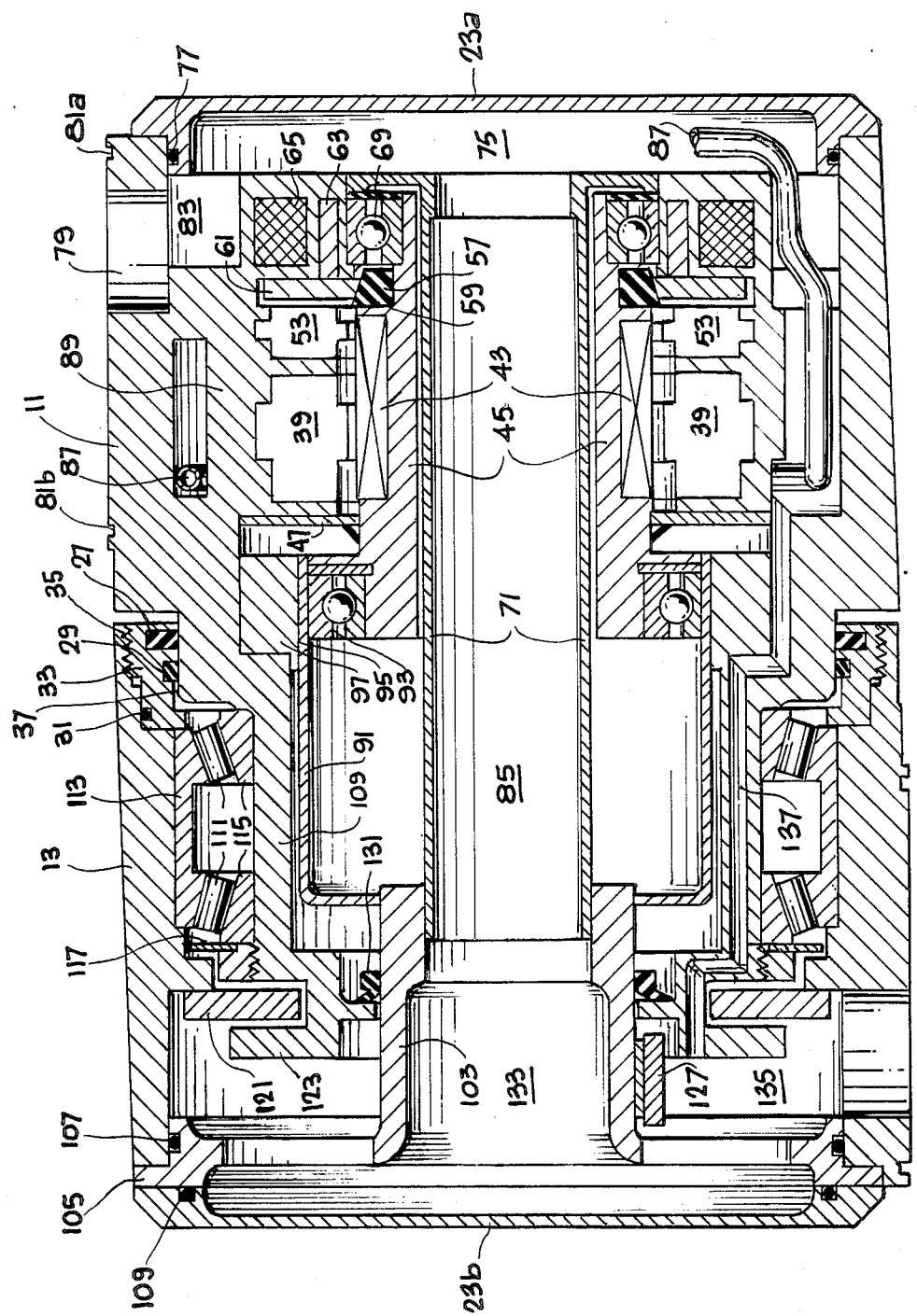
FIG. 4 is a sectional view of the joint of FIG. 1.

In FIG. 4 first sleeve 11 and second sleeve 13 have a number of assemblies which are internal to the sleeves and serve to transfer rotational power from the first sleeve to the second sleeve. The rotating seal which separates the two sleeves consists of a Ferrofluidics seal 27 and a Teflon rotating seal 29. "Teflon" is a registered trademark of DuPont Company for polytetrafluoroethylene. "Ferrofluidics" is a registered trademark of Ferrofluidics Corporation. Rotating Ferrofluidics seals are commercially available devices whose principle of operation is well known. The two sleeves 11 and 13 have a common central axis about which the annular seals 27 and 29 are disposed. A third seal member 31 is a static seal formed by a rubber O-ring sharing the same common axis. The seal members are held in place by a seal holder 33 which has a threaded portion 35 to position the seal holder securely with respect to the second sleeve 13. Teflon seal 29 and Ferrofluidics seal 27 bear upon a contact ring 37 which is flat on the contact side and on the opposite side is affixed to sleeve 11.

A first major assembly is a motor assembly in sleeve 11. This assembly includes a stator 39 which is annular in shape, consisting of a number of parallel, thin iron or steel plates laminated together in the usual way, with coils wrapped about portions of the stator for inducing a magnetic field in the laminated members. The moving part of the motor consists of an annular rotor 43 having an axis of rotation which is coaxial with sleeve 11 The rotor consists of magnets which are pressed onto an annular, rotating motor shaft 45. Motor shaft 45 is axial with sleeve 11.

A second motor constitutes a second major assembly and is disposed adjacent to the first motor. This assembly includes a stator 53 formed by a number of parallel plates and motor windings wrapped about portions of the stator. The second motor shares the same magnets which form a rotor 43. The second motor is operated as a generator serving as a tachometer and preventing the first motor from overshooting. The second motor monitors the velocity of the first motor and provides electrical signals to a servo control system which can adjust the amount of motor current which is fed to the first motor. The second motor is approximately one-third the size of the first motor and has the same circumferential dimensions about the sleeve axis as the first motor.

Adjacent to the second motor is a third major assembly, namely a brake. This assembly includes an annular anvil 57 which is fixed to the motor shaft 45. The anvil has a sloping surface 59 for contact by a nonrotating annular disk 61. The disk is biased forwardly, against the anvil, by a spring 63 in its normal position. A coil 65 is energized by electrical current whenever motor current is supplied to the first motor. Thus, when no motor current is supplied, the coil does not influence the disk and spring 63 pushes the disk against anvil 57, thereby stopping rotation of the first sleeve 11. Whenever motor current is supplied to motor 39, coil 65 pulls the disk toward the coil and away from anvil 57 thereby permitting rotation. The brake serves as a safety device which stops motion of the sleeve 11 whenever there is no power to the motor. This is an important safety feature in the event that power is lost in the middle of an operation. The joint is frozen in place by the brake until power is again applied.

Sealed bearing 69 separates rotating and nonrotating components of sleeve 11, with the rotating components being associated with motor shaft 45 and rotor 43, and the non-rotating components being associated with stators 39, coil 65 and connected components. A fixed tube 71 is radially inward of the motor shaft and has a common axis with the axis of sleeve 11. Fixed tube 71 serves as a passageway for electrical and fluid conduits which extend through the joint. Connection of fixed tube 71 is made to the fixed portion of bearing 69.

A hollow space 75 may be seen inward of fixed end cap 23a, the cap being sealed to the inner sleeve by means of an O-ring seal 77. The hollow space 75 serves as a spatial communication path from a sealable port 79 to which a member of a robot arm may be connected and sealed, for example by means of an O-ring seal seated in channels 81a, 81b. The port opens into a small plenum 83 which communicates with the space 75 and opens into the interior 85 of tube 71. For example, a fluid conducting pipe 87 is introduced through the sealable port and makes a loop about the first motor for carrying a coolant fluid into the first sleeve. Conduit 87 is brought into contact with a metallic block 89 so that a heat transfer relationship exists for cooling both the first motor and the second motor as well as the magnet beneath the motors.

Power from motor shaft 45 is transmitted to a fourth major assembly, namely a harmonic drive assembly where there is 100 to 1 motor speed reduction. Harmonic drives are well known and one is shown in U.S. Pat. No. 4,431,366. The harmonic drive includes a flexible spline 91, circular spline 97, and wave generator 93, which is bolted to motor shaft 45. The elliptically shaped wave generator causes a flexing of the flexible spline to an elliptical cross section. The back surface 95 of flexible spline 91 has teeth which engage teeth in a contacting surface of circular spline 97 which is fixed relative to flexible spline 91. Circular spline 97 is press fit into position in the first sleeve 11. The rotating flexible spline 91 extends into the interior of second sleeve 13 and is connected to an annular drive flange which has a common axis with sleeve 13 which, in turn, has a common axis with sleeve 11. Drive flange 103 extends outwardly having peripheral rim 105 which is sealed to sleeve 13 by means of O-ring 107. An end cap 23b is sealed to peripheral rim 105 by means of O-ring 109. The end cap is held in place by a screw 25. The rotation of sleeve 13 over the fixed brace 109 is supported by the annular canted bearings 111. The outer portion 113 of the bearing rotates while the inner portion 115 is fixed. An annular barrier 117 confines lubricant to the proximity of the bearing and limits it from travel.

Second sleeve 13 houses a position encoder constituting a fifth major assembly. A rotating plate 121 rotates with sleeve 13. This plate has windings which face corresponding windings on fixed plate 123. The motion of rotating plate 121 relative to fixed plate 123 yields position information for motor servo control. Position encoders such as synchros or resolvers, are well known and may attain a high degree of accuracy. The stationary position encoder plate 123 is connected to brace 109. The plate 127 provides support for fixed plate 123. A rotating seal 131 blocks wear particles from migrating along the drive flange outwardly toward end cap 23b.

Flange 103 has an interior opening 133 which opens into passageway 85. Opening 133 leads into an open chamber 135 which leads to a sealable port, similar to sealable port 79. The sealable port associated with chamber 135 is at right angles to port 79. Cables and conduits which pass from passageway 85 into the opening 133 in chamber 135 may egress through this port. Outer passageway 137 empties into the chamber 135 and serves as a means of spatial communication from chamber 135 to the region 139 in sleeve 11 where conduit 87 is located. In other words, a second passageway exists which is nonaxial and which is radially outward of most of the annular members which are coaxial with the two sleeves. Conduit 87 which encircles thermally conductive block 89 may exit through the passageway 137 into chamber 135 and out of the joint. On the other hand, the conduit might also double back on itself and exit the joint in the same manner as the entry.

The two-sleeve joint consists of brake, tachometer, motor, harmonic drive and position encoder assemblies, listed right-to-left. These assemblies are all annually disposed about the common axis of the sleeves 11 and 13 in a sealed relation therewith.

Figure 5:
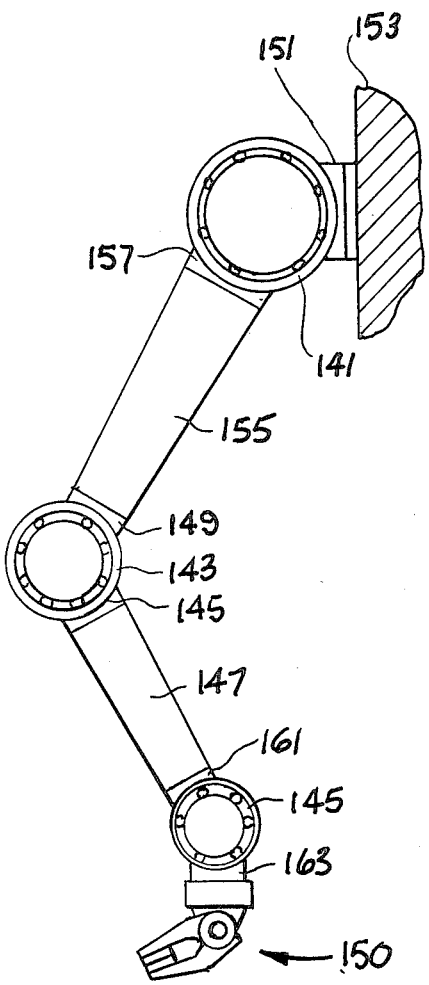
FIG. 5 is a simplified view of a portion of a robot arm showing use of the joint of FIG. 1 between arm members.

With reference to FIG. 5, a robot arm is seen to comprise a shoulder joint 141, an elbow joint 143 and a wrist joint 145. Each of these joints is generally similar to the joints shown in FIG. 1. Joint 141 will carry heavier loads since it must support all of the arm members. Joint 145 will be smaller in size because it will support a lesser load, namely the gripper assembly 150. Shoulder joint 141 has a first link 151 connecting a sealable port of the joint to a fixed base 153. Upper arm member 155 is connected to a second sealable port 157 of the joint.

Elbow joint 143 has a first sealable port 145 sealed to one end of lower arm link 147 and a second sealable port 149 sealed to the lower portion of upper arm link 155.

The lower end of the lower arm link 147 is sealed to the sealable port 161 of the wrist joint 145. Gripper assembly 150 is sealed to the second sealable port 163 of the wrist joint 145. Control cables and pneumatic conduits may pass through the passageways in the joints, extending from one port to the other, and through the link members from base 153 to gripper assembly 150. This provides a robotic arm in which control cables and fluid conduits are not visibly apparent.

The joints themselves may be pumped down to a slightly negative pressure, say 25 Torr, so that the difference in pressure in a vacuum chamber and the interior of the robot arm is not substantially great. At the same time, the sealing of the joint prevents particles from wear surfaces from contaminating an otherwise clean working environment.

We claim:

1. A sealed joint as for a robot comprising,
   first and second closed, laterally adjacent sleeves mounted for a rotation about a common axis, the sleeves separated by a rotary seal having two contacting members, one associated with each sleeve, and means for adjustably positioning the seal between the sleeves,
   a motor having a rotor and a stator mounted within the first sleeve, the rotor parallel to the axis of the sleeves, the second sleeve having a driven member, the two sleeves having a link member internally joining the rotor and the driven member, whereby the rotor transfers power to the link member so that the first sleeve drives the second sleeve, and means for sealing the two sleeves containing the motor, driven member, and link member assembly, and
   a fluid coolant tube extending into a sealable port of the first sleeve and communicating thermally with said motor.

2. The sealed joint of claim 1 wherein said link member is a member of a harmonic drive, the harmonic drive having a circular spline member, a flexible spline member and a wave generator, the circular spline, the flexible spline member and the wave generator coaxially enclosed within said sleeves.

3. The sealed joint of claim 1 wherein said first sleeve has a tachometer means in electrical communication with the motor for reporting motor velocity.

4. The sealed joint of claim 1 wherein said second sleeve has an internally mounted position encoder, the position encoder having a first encoder member movable with the first sleeve and a second encoder member movable with the second sleeve, the relative motion between the first and second encoder members yielding position information.

5. The sealed joint of claim 1 wherein the first sleeve includes a brake means for locking the rotor in place.

6. The sealed joint of claim 1 wherein each sleeve has sealable port means between the interior and exterior of the sleeve for sealed connection to robot arm members and a tube with open ends is axially disposed within the first sleeve, coaxially spaced from said rotor and coaxially spaced from and having an end near said driven member of the second sleeve, said driven member having a passageway from said tube end to the sealable port of the second sleeve, the opposite end of the tube communicating with the sealable port of the first sleeve, thereby defining a path from one sealable port, through the sleeves and to the other sealable port for passage of cables and conduits therethrough.

7. The sealed joint of claim 1 wherein said first sleeve has a tachometer means in electrical communication with the motor for reporting motor velocity and said second sleeve has an internally mounted position encoder, the position encoder having a first encoder member movable with the first sleeve and a second encoder member movable with the second sleeve, the relative motion between the first and second encoder members yielding position information, the tachometer and position encoder providing electrical signals for motor servo control.

8. The sealed joint of claim 2 wherein said rotor transfers rotary energy to said flexible spline member through said wave generator, said wave generator being a ball member mounted between the rotor and the flexible spline member.

9. The sealed joint of claim 5 wherein said brake means comprises an annular cone shaped member mounted on the rotor and a wedge mounted in fixed relation to the first sleeve, said wedge normally biased against the annular cone shaped member by a spring, said brake means having an electromagnetic coil means for retracting the wedge when electrical power is applied to the motor.

10. The sealed joint of claim 1 wherein sealable ports on the first and second sleeves are sealed and a negative pressure is applied to the interior of said sleeves.

11. A robot joint linking two robot arm members comprising,
    first and second closed sleeves mounted for rotation about a common axis, the sleeves separated by a rotating seal having two contacting members, one associated with each sleeve, and means for adjustably positioning the seal between the sleeves, the sleeves internally joined by a gear means for transferring power from the first sleeve to the second sleeve,
    a motor mounted in said first sleeve and having a rotor and a stator, the rotor parallel to the sleeve axis and connected to the gear means for power transfer thereto,
    brake means associated with said motor for stopping rotor motion when driving current is not applied to said motor,
    means for sealing the two sleeves containing the gear means, motor, and brake means, and
    a fluid coolant tube extending into a sealable port of the first sleeve and communicating thermally with said motor.

12. The robot joint of claim 11 wherein said motor has an annular rotor and stator surrounding a centrally disposed tube having an axis common with said sleeves.

13. The robot joint of claim 12 wherein said brake means comprises a pair of annular friction members surrounding said centrally disposed tube and having an axis common with said sleeves.

14. The robot joint of claim 11 wherein said gear means comprises a harmonic drive having a circular spline, a flexible spline and a wave generator, all surrounding said centrally disposed tube, the circular and flexible splines having an axis common with said sleeves.

15. The robot joint of claim 11 wherein said second sleeve has an annular drive flange connected to said tube, the flange having an axis common with said sleeves whereby said drive flange and said tube form a passageway through said sleeves along said axis.

16. The robot joint of claim 11 wherein a negative pressure is applied to the interior of said sleeves.

17. A sealed robot joint comprising,
    first and second coaxially adjacent closed sleeves mounted for rotation about a common axis, the sleeves separated by a rotary seal having two contacting members, one associated with each sleeve, and means for adjustably positioning the seal between the sleeves,
    a motor, a harmonic drive speed reducer receiving power from the motor, a tachometer and a brake both associated with the motor, all annularly disposed at least partially within the first sleeve, the motor having an annular rotor coupled to the harmonic drive speed reducer which, in turn, is coupled to the second sleeve, and
    position encoder means annularly disposed within the second sleeve for measuring the position of the second sleeve relative to the first sleeve,
    means for sealing the two sleeves containing the motor, harmonic drive, tachometer, and brake, and
    a fluid coolant tube extending into a sealable port of the first sleeve and communicationg thermally with said motor.

18. The sealed joint of claim 17 wherein a tube is disposed along said axis within the annular space of said motor, harmonic drive, tachometer and brake, said second sleeve having an annular drive flange along said common axis, said tube connected to said flange thereby forming a passageway along said axis through the first and second sleeves, said sleeves having sealable ports in spatial communication with said passageway.

19. The sealed joint of claim 17 where a negative pressure is applied to the interior of said sleeves.

* * * * *